United States Patent [19]

Campbell et al.

[11] Patent Number: 5,718,852
[45] Date of Patent: Feb. 17, 1998

[54] PROCESS CONTROLLING A BLOW MOLDING MACHINE

[75] Inventors: G. Edward Campbell, Petaluma; Casper W. Chiang, San Ramon; Victor M. Castillo, Livermore; Frederick C. Wolters, Pleasanton, all of Calif.; Jerry Baker, Tampa, Fla.; John D. Crossan, Downers Grove; Jeff E. Gallaher, Bolingbroke, both of Ill.; Jay A. Rouse; Ronald E. Heiskell, both of Tracy, Calif.

[73] Assignee: The Clorox Company, Oakland, Calif.

[21] Appl. No.: 241,275

[22] Filed: May 10, 1994

[51] Int. Cl.$^6$ .................................................. B29C 49/78
[52] U.S. Cl. .................... 264/40.1; 264/40.4; 264/40.7; 264/541
[58] Field of Search ...................... 264/541, 40.1, 264/40.4, 40.7

[56] References Cited

U.S. PATENT DOCUMENTS

| | | |
|---|---|---|
| 3,616,495 | 11/1971 | Lemelson . |
| 3,759,648 | 9/1973 | Hunkar ..................... 264/541 |
| 3,898,209 | 8/1975 | Watson et al. . |
| 4,040,233 | 8/1977 | Valyi . |
| 4,056,344 | 11/1977 | Lemelson . |
| 4,213,747 | 7/1980 | Friedrich . |
| 4,244,897 | 1/1981 | Moon . |
| 4,282,177 | 8/1981 | Kurtz et al. . |
| 4,318,874 | 3/1982 | Lemelson . |
| 4,382,761 | 5/1983 | Daubenbuchel et al. ............... 264/541 |
| 4,444,702 | 4/1984 | Thomas et al. ......................... 264/531 |
| 4,448,736 | 5/1984 | Emery et al. . |
| 4,469,649 | 9/1984 | Ibar . |
| 4,511,530 | 4/1985 | Olsson et al. . |
| 4,551,289 | 11/1985 | Schwab et al. . |
| 4,568,261 | 2/1986 | McHenry et al. . |
| 4,721,589 | 1/1988 | Harris . |
| 4,810,438 | 3/1989 | Webster et al. . |
| 4,824,618 | 4/1989 | Strum et al. . |
| 4,948,543 | 8/1990 | Pawlowski et al. . |
| 4,992,487 | 2/1991 | Rao . |
| 5,102,588 | 4/1992 | Feuerherm ............... 264/541 |
| 5,256,346 | 10/1993 | Feuerherm ............... 264/541 |
| 5,399,302 | 3/1995 | Noguchi et al. ........... 264/541 |

FOREIGN PATENT DOCUMENTS

| | | |
|---|---|---|
| 0345474 | 5/1989 | European Pat. Off. . |
| 0562202 | 12/1992 | European Pat. Off. . |
| 06206251 | 7/1994 | Japan . |

OTHER PUBLICATIONS

"Modeling of Membrane Inflation in Blow Molding: Neural Network Prediction of Initial Dimensions from Final Part Specifications", Diraddo et al., *Advances in Polymer Technology*, vol. 12, No. 1, pp. 3–24, 1993.

"Plastic Blow Molding Handbook", by Norman C. Lee, P.E., pp. 422–423, 414–417, 1990.

"On-Line Rheology Enhances Quality, Keeps Costs Down," by R.F. Callahan et al. *Modern Plastics*, pp. 96–98, May 1994.

(List continued on next page.)

Primary Examiner—Catherine Timm
Attorney, Agent, or Firm—Majestic, Parsons, Siebert & Hsue

[57] ABSTRACT

The method for controlling a blowmolding machine during a process of making an object is disclosed. The machine includes a die head, a mandrel and an extruder that rotates and drives a plastic material between the mandrel and the die head to form a plurality of elongated parisons. The method comprises setting the distance between the die head and the mandrel and the rotation speed of the extruder to accomplish predetermined target values of the weight of the object and parison velocity. Plastic material is fed to the machine and the extruder is operated to form the parisons. A parameter related to the viscosity or melt index of the plastic material in the extruder is detected and the material distribution function and the speed of the extruder are adjusted in response to the parameter so that object weight and velocity of the parisons made are maintained substantially at target values.

27 Claims, 6 Drawing Sheets

OTHER PUBLICATIONS

"An Extruder that can be Used as a Rheometer," by K. Kreisher, Modern Plastics 1 page, May 1994.

"Encyclopedia of Chemical Technology," Third Edition, vol. 16, Kirk–Othmer, pp. 421–452.

"Plastics Processing," vol. 18, pp. 184–206, 1982.

"Viscoliner—Put Viscosity Inline with Quality," Nametre Process Control Viscometers, brochure.

Article entitled "Resin Inconsistency Irritates Processors," 2 pages.

"Smarteye—the Most Versatile Photoelectric Sensor in the World," Tri–Tronics Co., Inc., Tampa Florida, pp. 1–6.

"LUT 1–4 Luminescence Scanner."

"The Effect of Machine Process Monitoring and the Use of CIM on the Operation and Productivity of Blow Molding Plants," by Hunkar, Hunkar Laboratories, Inc. 1993 Best Presentation at ANTEC.

"Predicting System Behavior Through Past Experience Similarity—or 'I Taut I Taw a Putty Tat'," by Tenorio, Advanced Technology for Developers, article, pp. 14–17.

"Extrusion Blow Molding," by Don Peters, Chapter 2, pp. 21–59.

"The Effect of Machine Process Monitoring and the Use of Cimon the Operation and Productivity of Blow Molding Plants," by Fricke, Hunkar Laboratories, pp. 139–148, Cherry Hill, New Jersey, Oct. 4–6, 1993.

"Advanced Blow Molding Controls, Closing the Loop on Quality," by West et al. Siemens Industrial Automation, Inc., pp. 169–179, Cherry Hill, New Jersey, Oct. 4–6, 1993.

"Learning and Reasoning by Analogy," by Winston et al., vol. 23, No. 12, pp. 689–703, Dec. 1980.

"Toward Memory–Based Reasoning," by Stanfill et al., Communications of the ACM vol. 29, No. 12, pp. 1213–1228, Dec. 1986.

"Instant Viscoelastic Properties," by Nametre Company, Metuchen, New Jersey.

PROCESS CONTROLLING A BLOW MOLDING MACHINE

BACKGROUND OF THE INVENTION

This invention relates in general to a system for controlling a blow molding machine during a process of making a hollow object, and in particular, to a system for controlling a blow molding machine where the shot weight and parison velocity achieved using the machine are maintained within predetermined tolerances of target values.

Blow molding is the forming of a hollow object by "blowing" a thermal plastic molten tube called a parison in the shape of a mold cavity. Extrusion blow molding is the most widely used of many blow molding methods. Bottles made using the extrusion blow molding method are commonly used for holding a wide variety of products, such as milk, juice, household cleaning fluids, motor oil, pharmaceuticals, and many industrial products.

In making many bottles or other hollow objects using the extrusion blow molding method, it is important to maintain a constant shot weight and desired thicknesses at various portions of the bottle. Bottles with walls that are too thin would not have adequate mechanical strength whereas bottles with walls that are too thick are a waste of plastic material and compound the solid waste problem upon disposal. It is therefore desirable for the bottles made by extrusion blow molding to achieve an optimum shot weight.

In extrusion blow molding, a plastic raw material is fed to an extrusion chamber housing an extrusion screw. When the screw is rotated, the frictional heat that develops melts the plastic and the rotation of the screw also forces the molten plastic through the annular space between a mandrel and a die head to form a parison. The parison is enclosed within a mold and air is injected within the molten tube so that it takes on the shape of the mold in order to form the bottle or other hollow object. The thicknesses of different portions of the bottle or object wall are determined by the varying thicknesses of the parison. The parison thickness is typically controlled by varying the distance between the mandrel and die head as the molten plastic is forced through the annular space between the mandrel and the die head. In many extrusion blow molding machines, the distance between the mandrel and die head is controlled in a programmed manner.

Another important parameter for controlling shot weight and thicknesses of different portions of the bottle or other hollow object is the velocity at which the molten plastic is forced through the annular space between the mandrel and the die head, or parison velocity. In some cases the parison length instead of parison velocity is the parameter important for controlling shot weight and the thicknesses of the hollow object. Therefore, by controlling the blow molding process so that the shot weight and parison velocity are maintained to be within the determined tolerances from target shot weight and parison velocity values, bottles or other hollow objects with the optimum weight and thicknesses can be obtained. For simplicity in description, it will be understood that methods of making bottles described below will apply as well to the making of other hollow objects.

Extrusion blow molding may be continuous or intermittent. Two of the most common continuous blow molding systems are the shuttle-type and wheel-type. These types of continuous extrusion machines as well as other blow molding machines are described in more detail in Chapter 2 entitled "Exclusion Blow molding" by Don Peters, pages 21–59 in "Plastic Blow molding Handbook" edited by Norman C. Lee, P. E. Van Nostrand Reinhold, New York, N.Y. 1990. As explained in more detail in the above reference, in a shuttle-type machine, when the parisons extruded downwards from the die head are at the proper length, the mold halves close on the parisons and a hot knife cuts the parison between the top of the mold and die head. The press and molds then move back down to the molding station and air is introduced inside the parisons to blow the parisons out against the cavity walls.

A wheel-type machine is shown in FIG. 2–4 in the above reference. In the wheel-type machine, the extruder forces the molten plastic to exit in the annular space between the mandrel and the die head in a continuous tube. The continuous tube is positioned to be pressed upon sequentially by a number of molds at the periphery of a rotating wheel, each mold closing sequentially to enclose a section of the continuous tube where air is introduced into the tube to force the tube against the mold and the tube is cut to form shots. In addition to continuous extrusion blow molding processes, intermittent extrusion blow molding machines, such as one using a reciprocating screw, have also been used. Appendix A attached lists a number of definitions used in extrusion blow molding.

In conventional extrusion blow molding, it has been difficult to achieve a consistent shot weight and parison velocity. The shot weight and parison velocity appear to vary with a large number of parameters, each of which may undergo changes over time in the course of extruding a large number of bottles. Thus, the viscosity of the molten plastic may change depending on the characteristics of the plastic raw material fed to the blow molding machine. For example, if the raw plastic includes varying amounts of recycled material, it will be difficult to predict the viscosity of the plastic material fed to the machine. Another parameter considered important in conventional extrusion blow molding is temperature of the molten plastic. As the blow molding machine ages with use, the machine characteristics may also change, making it more difficult to achieve consistently a constant shot weight and parison velocity. For these reasons, extrusion blow molding control is more of an art than a science and operator experience with different machines is especially important. It may be difficult to predict adjustments that may be necessary so that shifts in shot weight and parison velocity are not discovered until they deviate significantly from those desired, resulting in waste and costly shutdowns. It is therefore desirable to provide a system for controlling extrusion blow molding whereby the above-described difficulties are alleviated.

In U.S. Pat. No. 4,448,736, Emery et al. propose a continuous in-line melt flow rate control system where pressure upstream from the die head of the extrusion system is sensed to indicate viscosity and feed rate. Viscosity of the plastic raw material fed to the extrusion machine is changed by mixing the material with a degradent. The amount of degradent added is varied in response to the viscosity and feed rate sensed so as to maintain a constant temperature and pressure in order to maintain a constant target melt flow rate. In U.S. Pat. No. 4,551,289, Schwab et al. propose a method and apparatus for maintaining a constant wall thickness for an extruded article. Yet a third scheme is proposed by Harris in U.S. Pat. No. 4,721,589, where pressure between the gear pump and the die in the extruder is sensed and temperature of the melt in the extruder is altered in response to the pressure changes sensed so as to maintain a constant pressure and hence a presumed constant viscosity of the melt in the extruder.

None of the above-described systems proposed is entirely satisfactory for solving the above-described problems. It is therefore desirable to provide an improved control system with better characteristics.

SUMMARY OF THE INVENTION

This invention is based on the observation that, by adjusting the distance between the die head and the mandrel and the speed of the extruder in the operation of the machine, it is possible to maintain shot weight and parison velocity substantially at target values despite changes in viscosity of the plastic melt or other parameters. One aspect of the invention is directed towards a method for controlling a blow molding machine during a process of making a bottle or other hollow object. The machine includes a die head, a mandrel, and an extruder that rotates and drives a plastic material between the mandrel and the die head to form a plurality of elongated parisons. The method comprises setting the distance between the die head and the mandrel and the rotational speed of the extruder to accomplish predetermined shot weight and parison velocity, feeding said plastic material to the machine and operating the extruder for forming the parisons, and adjusting the material distribution function of the bottle or object and speed of the extruder in the operation of the machine and extruder so that shot weight and velocity of the parisons made are maintained substantially at target values.

Another aspect of the invention is directed towards a method for controlling a blow molding machine during a process of making the bottle or other hollow object. The machine includes a die head, a mandrel, and an extruder that rotates and drives a plastic material between the mandrel and die head to form a plurality of elongated parisons. The method comprises setting the distance between the die head and the mandrel and the rotational speed of the extruder to accomplish predetermined shot weight and parison velocity, feeding the plastic material to the machine and operating the extruder for forming the parisons. The method further comprises predicting shot weight and parison velocity when the distance between the die head and the mandrel or the extruder rotational speed is increased or reduced by predetermined amounts, selecting an adjustment defined by the increase or reduction of the distance or extruder rotational speed that minimizes the differences between the predicted shot weight and parison velocity and the predetermined shot weight and parison velocity. The method also comprises adjusting a material distribution function of the bottle or object or the speed of the extruder in the operation of the machine according to said selected adjustment so that shot weight and velocity of the parisons made are maintained substantially at the predetermined target values.

DETAILED DESCRIPTION OF THE PREFERRED EMBODIMENT

Figure 1:
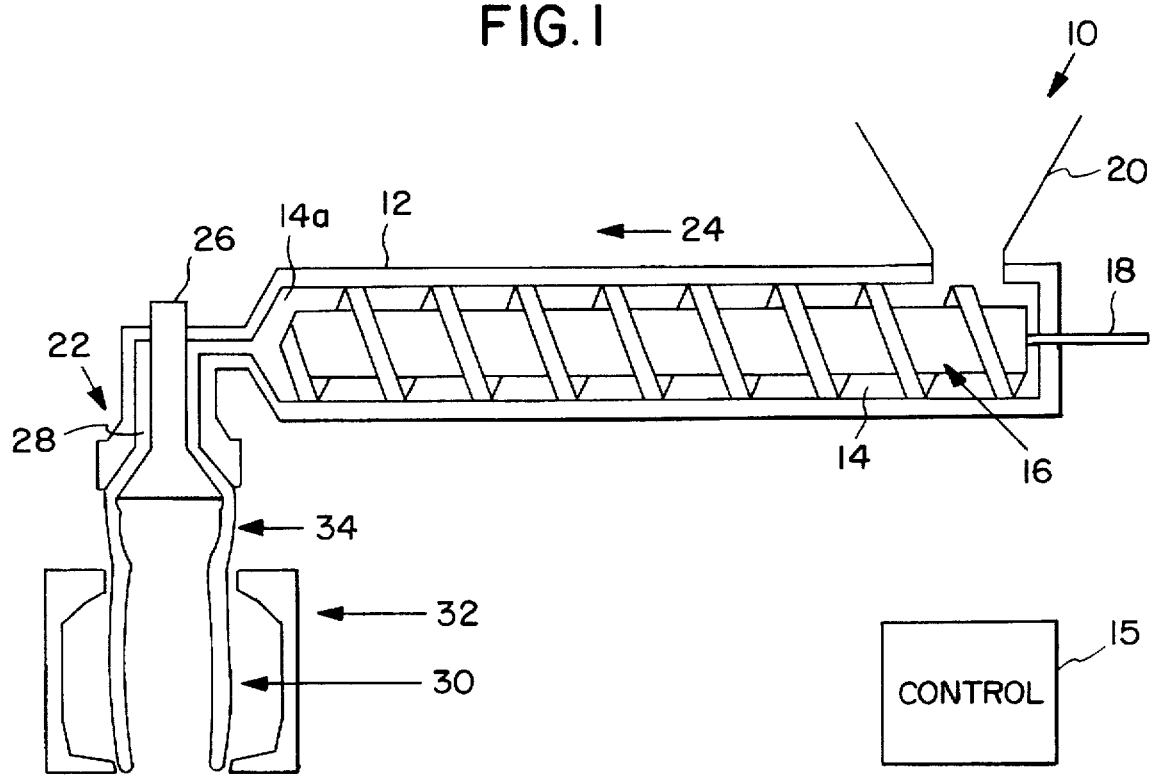
FIG. 1 is a schematic view of an extrusion blow molding machine and a control system for controlling the machine to illustrate the invention.

FIG. 1 is a schematic diagram of an extrusion blow molding machine to illustrate the invention. While the invention is described below by reference to the making of bottles, it will be understood that the same process is applicable to the making of other hollow objects as well. As shown in FIG. 1, machine 10 includes a housing 12 defining an extrusion chamber 14 therein. An extruder screw 16 in chamber 14 is rotated by a control system 15 through a shaft 18. To simplify FIG. 1, the connections between the control system on one hand and shaft 18 as well as other components of the machine 10 on the other hand are omitted. A plastic raw material or resin is fed through a hopper 20 to chamber 14. The plastic material or resin is then carried forward towards the die head 22 along direction 24 by the rotational motion of extruder screw 16. Disposed in die head 22 is a mandrel 26, leaving an annular space 28 between the mandrel and the die head. Rotational motion of screw 16 generates frictional heat that melts the plastic material or resin so that when such material or resin approaches the die head, the material or resin becomes a melt. Rotational motion of the screw forces such melt into the annular space 28 between the die head and mandrel to become a parison 30. Parison 30 is enclosed within a mold 32. In a shuttle-type extrusion blow molding machine, the parison is cut at a location between the die head and the mold such as at location 34. In a wheel-type machine, the parison is cut off in the mold. Air is then injected in the parison to force the parison against the walls of the mold 32 so as to form the desired bottle.

The thickness of the parison 30 can be controlled by varying the distance between die head 22 and mandrel 26. As known to those skilled in the art, it is common to continually vary the distance between the die head and the mandrel when the plastic or resin melt is pushed through the annular space 28 to form the parison so that the bottle created thereby would have the desired local thicknesses for different portions of the bottle wall. The variation of the distance between the mandrel and die head is controlled usually in a preprogrammed manner and in some instances may comprise ninety or more preprogrammed adjustments of the distance. Shot weight and parison velocity would depend on an average of the distance between the die head and the mandrel. In the shuttle-type machine, the average distance is set by setting the initial distance or "weight gap" between the die head and the mandrel, so that the preprogrammed sequence of altering the distance between the die head and the mandrel is performed by making positive or negative adjustments from the weight gap. In a wheel-type machine, since a continuous tube is produced, the average distance between the die head and the mandrel is adjusted by adjusting the time synchronization between the cutting of the tube to form shots and the above-described preprogrammed alteration of the distance between the die head and the mandrel.

The applicants performed a study of various parameters affecting shot weight and parison velocity using a shuttle-type extrusion blow molding machine. Experimental data with melt index, extruder RPM, weight gap, parison shot weight, parison viscosity, pressure in chamber 14 near the die head such as at location 14a and parison velocity are monitored. The experimental data obtained are shown, for example, in Appendix D. The viscosity of the plastic melt can be measured continuously using a rheometer such as the model 2000 series from Nametre Company, Metuchen, N. J. The rheometer as well as the pressure gauge for measuring melt index and pressure of the melt may be placed in chamber 14 near the die head, such as at or near location 14a. Extruder RPM is monitored through control system 15 in a manner known to those skilled in the art. Weight gap is the initial distance set between the mandrel and die head, and shot weight is measured in a conventional manner.

Figure 2:
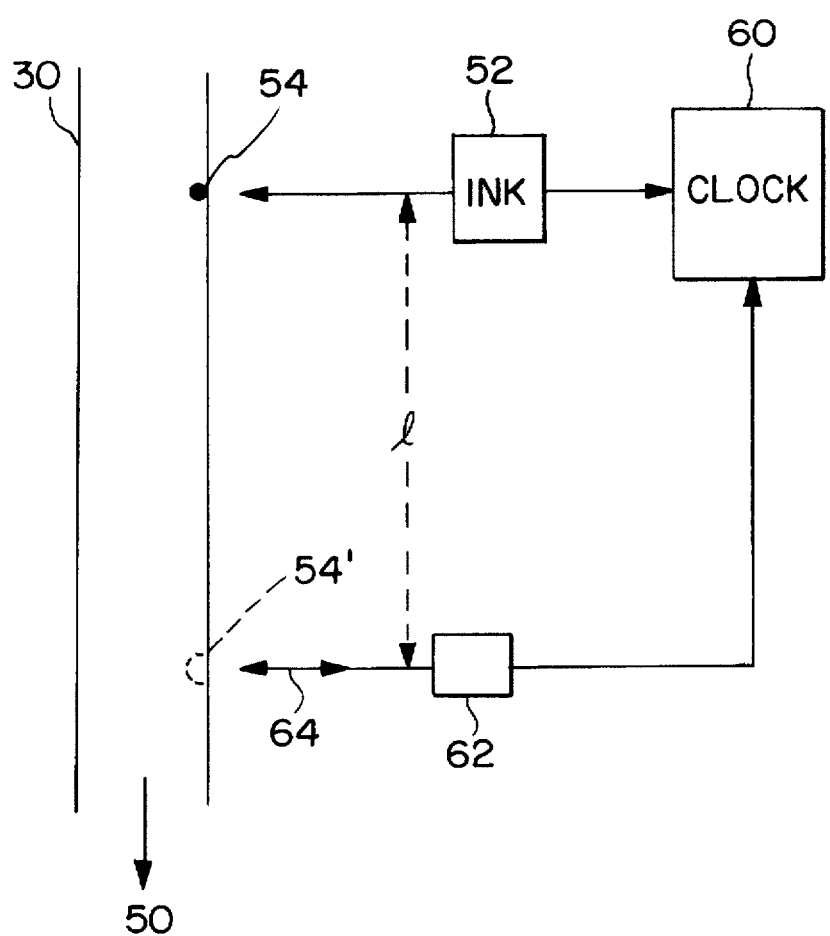
FIG. 2 is a schematic view of a system for measuring parison velocity to illustrate the invention.

FIG. 2 is a schematic view of a parison and a system for measuring parison velocity to illustrate one embodiment of the invention. As shown in FIG. 2, parison 30 travels along arrow 50 at a certain velocity. An ink labeler 52 labels parison 30 with an invisible but ultraviolet sensitive ink in the form of a dot of ink at location 54. A suitable labeler or marker that may be used for this purpose is the universal DS-10AF marker from Universal Stenciling & Marking Systems, St. Petersburg, Fla. Ink labeler 52 starts a clock 60 when spot 54 on parison 30 is labeled by the labeler. As parison 30 travels along arrow 50, spot 54 also moves along direction 50 and appears at a time period t after the clock 60 has been started at spot 54'. At such instance, spot 54' is sensed by ultraviolet detector 62. Detector 62 includes an ultraviolet light source that provides ultraviolet light along path 64 to parison 30. When the ultraviolet light hits ink spot 54', the ink will fluoresce and emit detectable light. Such detectable light along path 64 is detected by a scanner in detector 62 which causes an output relay in detector 62 to send a signal to clock 60, thereby stopping the clock. Therefore, if the time taken for signal generation and travel in the detection system can be ignored, the time period t for the parison 30 to travel the distance d between paths 56 and 64 is measured by clock 60. The ratio of d to such time period will give the parison velocity of parison 30 traveling along arrow 50. Instead of actually marking the parison and detecting the mark by means of fluorescence, it is also possible to detect parison velocity by an infrared or visible light scanner where a clock is triggered upon initiation of the extrusion of the parison, and stopped when the parison falls to a position where it is sensed by the scanner. An infrared or visible light scanner suitable for such purpose is the Smarteye visible light detector from Tri-Tronics Company, Inc., Tampa, Fla.

From the experimental data such as that shown in Appendix B, the applicants perform a multiple linear regression analysis with melt index, extruder RPM and weight gap as independent variables and produced an excellent fit with parison shot weight as the dependent variable (with an adjusted $R^2$ or correlation coefficient greater than 0.99) and good fits with the parison velocity and viscosity as dependent variables (with adjusted $R^2$ values of about 0.92 and 0.91, respectively) for full quadratic models in all three independent variables. The viscosity of the melted polymer or plastic is measured continuously so that similar multiple linear regression analysis may be performed with extruder RPM, weight gap, and viscosity as the independent variables. From such multiple linear regression analysis, the applicants discovered that parison velocity and shot weight are related to weight gap, extruder RPM and parison viscosity in accordance with the following equations:

$$\text{parison velocity} = -4.4724 - 0.2173g + 0.00306g_2 + 0.4354r - 0.00693gr - 0.0047r^2 \quad (1)$$

$$\text{shot weight} = -34.90 - 1.042g + 6.673r + 0.0449gr - 0.1402r^2 0.00043v \quad (2)$$

where g is the weight gap, r is the extruder RPM, and v is the parison viscosity. These models fit the data quite well. The parison velocity equation has an adjusted $R^2$ of 0.95 and the shot weight equation has an adjusted $R^2$ of 0.99. A comparison of experimental data and predicted values from the above equations for the velocity and weight are provided in Tables 1 and 2 in Appendix D.

The high correlation coefficient values and the low residuals in Tables 1 and 2 both attest to the fact that both parison velocity and shot weight can be well accounted for by simple quadratic models. It will be understood, however, that other models may also fit the experimental data set forth in Appendix B, such as polynomial models other than quadratic. Furthermore, it is believed that the particular coefficients in equations 1 and 2 above may depend upon particular types of shuttle-type machines used, although the forms of the equations are expected to remain the same. Such and other variations are within the scope of the invention.

From equations 1 and 2 above, it is evident that even though the parison viscosity may change over time and is difficult to predict, it is possible to maintain the shot weight and parison velocity at predetermined target values within predetermined tolerances by altering either the extruder RPM or weight gap, or both. Thus, to achieve predetermined target parison velocities and shot weights, equations 1 and 2 are used to calculate the initial values for weight gap and extruder RPM based on the initial parison viscosity. The weight gap and extruder RPM are then set to such values initially. Plastic raw material is then fed to the blow molding machine to make bottles as described above. As parison viscosity and/or nature of plastic raw materials change over time and during the course of extruding a number of bottles, the weight gap or extruder RPM or both may be altered so that shot weight and parison velocity are maintained at target values within predetermined tolerances.

In order to better control the process, it may be desirable to detect a parameter v related to the viscosity or melt index of the material fed to the machine. In the preferred embodiments, such parameter may be detected by measuring pressure in the plastic melt in the extruder at a location near the die head, such as by means of a pressure gauge at location 14a. After the parisons are formed, they are molded into bottles using molds in the manner described above, and the weights of the bottles are measured.

In a more general form than equations (1) and (2) above and applicable to blow molding machines such as shuttle-type machines, the shot weight may be a quadratic function of the speed of the extruder and a linear function of the weight gap and the viscosity of the plastic material. Parison velocity, on the other hand, is a quadratic equation of the speed of the extruder and weight gap. In a still more general form, the shot weight and parison velocity are polynomial functions of the speed of the extruder, weight gap and the viscosity of the plastic material. In the above process of making bottles, plastic material is continually fed to the blow molding machine. The above-described adjusting step adjusts the distance between the die head and the mandrel or the speed of the extruder in the operation of the machine in response to changes and characteristics of the plastic material fed to the machine or changes in operation of the conditions of the machine according to the above described relationship between the parison weight, parison velocity, speed of the extruder, weight gap and the viscosity of the plastic material, in order to maintain bottle weight and parison velocity within predetermined tolerances of target values. In one embodiment, updated values of the weight gap and extruder speed are calculated using the above equations by means of controller 15 in FIG. 1. The weight gap and extruder speed are then adjusted to such updated values either manually or automatically by means of controller 15.

In equations 1 and 2 above, parison viscosity is one of the three independent variables. Such variable is inversely proportional to what is known as the melt index of the plastic material fed to the machine. While the viscosity or melt index of the plastic material may be detected directly by a rheometer or viscometer, it may be adequate to measure the pressure in the extruder chamber 14 at a location near the die head such as at location 14a, where such measured pressure is proportional to viscosity and inversely proportional to melt index of the plastic material.

The high $R^2$ values and the low residuals in Tables 1 and 2 both attest to the fact that both parison velocity and shot weight can be well accounted for by simple quadratic models. The relationship between the independent variables and the dependent variables is somewhat complex, as can be shown in a series of isocontours for velocity and shot weight at constant viscosity in Appendix D. The shot weight and velocity isocontours can intersect at more than one point under some conditions. This means that there are some combinations of shot weight and velocity for which the corresponding percent weight gap and extruder RPM values are not unique. There are also velocity-weight combinations for which no corresponding weight gap-extruder RPM pairs can be found. For a given viscosity, the problem of finding the values of weight gap and RPM which correspond to a particular pair of desired values of velocity and shot weight reduces to the geometric problem of finding the intersections of two conic sections. There are four solutions to this problem, but some or all of them may be imaginary. Thus, there will be from zero to four real solutions for a given pair of ellipses. Moreover, some of these solutions will correspond to weight gap-extruder RPM values that cannot be obtained with our equipment. This problem may be solved in closed algebraic form as outlined in Appendix C, but it is far more practical to solve such problems numerically using software such as MATHEMATICA from Wolfram Research Inc., Champaign, Ill.

Wheel-type Machine

Experimental data has also been taken using the wheel-type extrusion blow molding machine. The data is taken by manually adjusting the extruder RPM and the parison program synchronization (sync). The extruder RPM is adjusted to control the bottle weight. The sync is adjusted after the operator examines the bottles for proper distribution of the material. The sync is defined as the time delay between the initiation of the pre-programmed adjustments of the distance between the die head and the mandrel and the cutting of the continuous tube into shots. Experimental data was obtained by running the machine with three different resins having melt index levels of 0.24, 0.30 and 0.36. At each melt index, the extruder was operated at three different RPM's. The RPM levels corresponded to the high, low and midpoint of the operation range for which a bottle could be made to pass quality control specifications. At each experimental setting, the sync is adjusted until the bottles had a proper distribution of plastic material. The melt temperature, pressure before (p1) and after (p2) the screen (not shown in FIG. 1) in the extruder chamber 14, viscosity probe reading, bottle shot weight, and trimmed bottle weight were all recorded. The screen used may, for example, be the High Tech Screen Changer from the High Technology corp., Hachensack, N.J. To measure the pressure in the extruder chamber before and after the screen, two pressure gauges (not shown) may be installed, one before and one after the screen at locations such as 14a in FIG. 1. The viscosity probe may be installed at generally the same location.

Analysis of the experimental data showed that the bottle weight is related to the extruder RPM and the melt index of the raw plastic material. It is also discovered that where the deployment of a viscosity probe is not practical or effective, the parison exit pressure is also a good indicator for the change in the melt rheology, so that the viscosity of the plastic melt is indicated by a pressure transducer installed after the screen filter and before the extruder die head for measuring the exit pressure of the melt.

Figure 3:
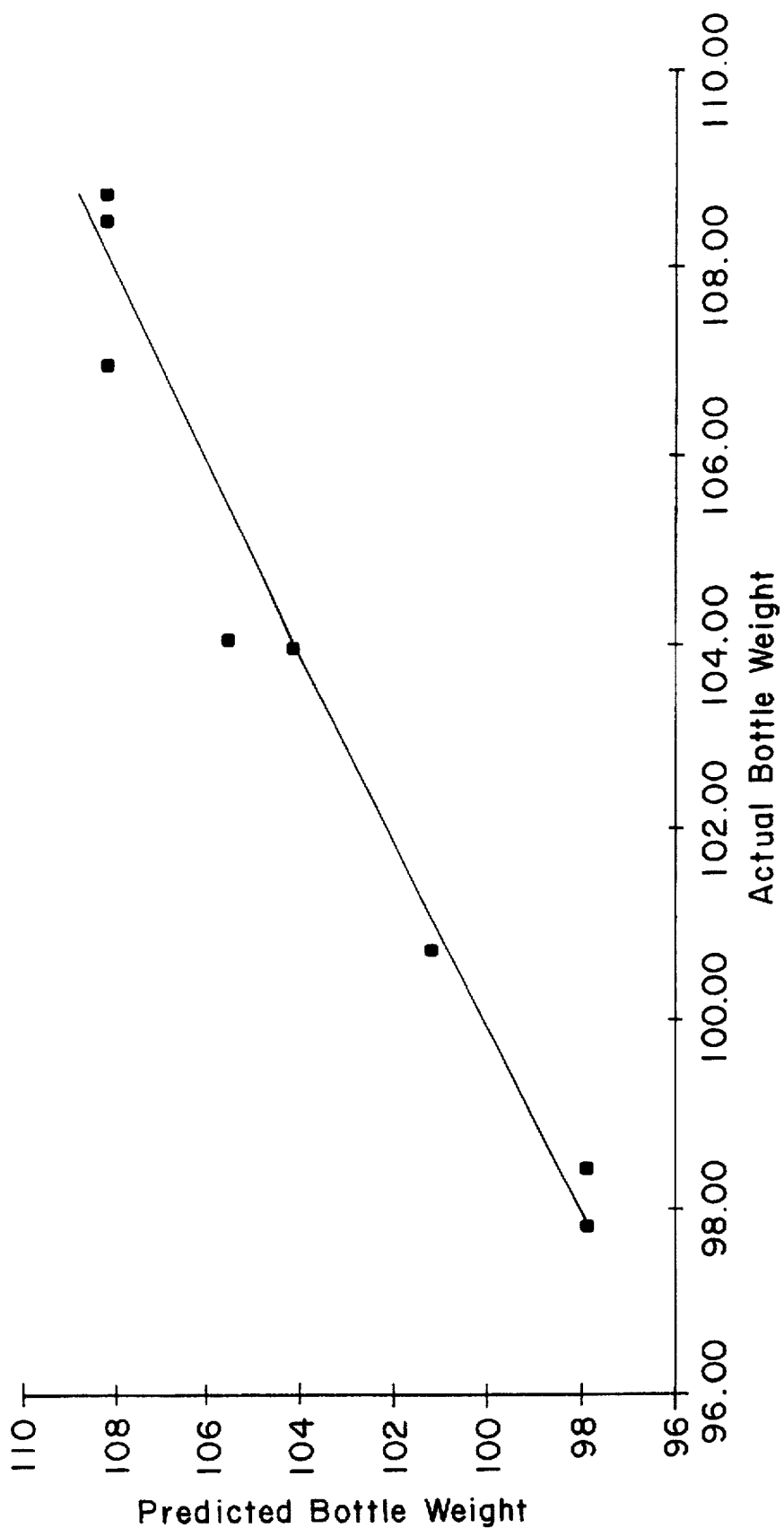
FIG. 3 shows a plot of the actual bottle weight verses the predicted bottle weight to illustrate the invention.
Figure 4:
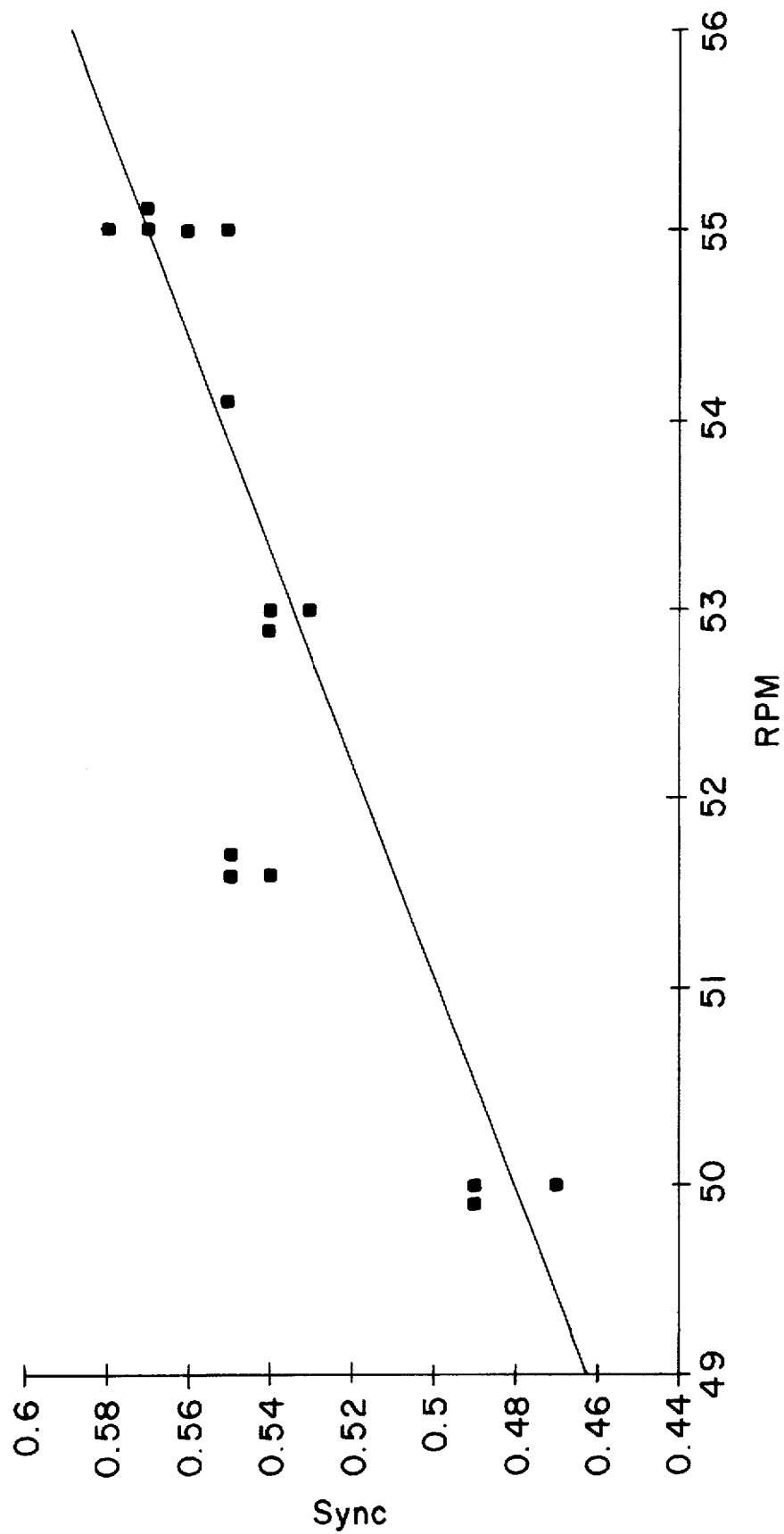
FIG. 4 is a plot showing sync setting verses extruder RPM for all melt index levels to illustrate the invention.

Again using multiple linear regression analysis, the expected bottle weight using the wheel-type machine can be expressed by the following regression equation:

$$\text{bottle weight} = -7.546 + 2.104 \text{RPM} + 1.02 \text{E} - 5 p_2 \quad (3)$$

where RPM is the extruder rotational speed and $P_2$ is the parison exit pressure. This regression equation fits the data with an adjusted $R^2$ value of 0.92. FIG. 3 shows a plot of the actual bottle weight verses the predicted bottle weight using this model. It should be noted that the range of the $p_2$ coefficient accounting for error in the least squares calculation spans zero. Therefore, data should be collected for a wider range of melt index levels to more accurately pinpoint this coefficient. As is the case in other wheel-type machines, the weight gap is kept constant; in other words, no adjustment is made to the average distance between the mandrel and the die head. Instead, to assure that the plastic material is properly distributed across the bottle wall, sync is adjusted. The process operator evaluates the proper distribution of plastic material across the bottle by a combination of skillful squeezing and poking. FIG. 4 is a plot showing sync setting verses extruder RPM for all melt index levels. These points seem to follow a linear trend with the extruder speed independently of the parison rheology. The line that best represents this trend is:

$$\text{sync} = -0.422 + 0.018 \text{RPM} \quad (4)$$

It is worth noting that the points farthest from the lines were settings used early in the experimentation. As the system is stabilized, the optimum sync setting converged to the line represented by equation 4.

Using the above equations, the following control equations may be derived:

$$\text{RPM}_{new} = \text{RPM}_{current} - 0.4753(\text{Target} - \text{bw}_{current}) + 1.02\text{E} - 5(\text{P2}_{current} - \text{P2}_{old}) \quad (5)$$

$$\text{sync} = -0.422 + 0.018 \text{RPM} \quad (6)$$

where $\text{RPM}_{new}$ is the new RPM target value calculated based on the current RPM value $\text{RPM}_{current}$, the current bottle weight ($\text{bw}_{current}$), the current parison exit pressure ($\text{P2}_{current}$) and the parison exit pressure ($\text{P2}_{old}$) measured when extruding the parison resulting in said current value of the bottle weight ($\text{bw}_{current}$). This calculation requires knowledge of the lag time between extrusion and weighing of the bottle to obtain the bottle weight. The synchronization sync is then set based on the new RPM setting $\text{RPM}_{new}$. In other words, since it will take time to cut the parison, blow mold the hollow object, and then weigh the object, the parison exit pressure may have changed. Thus, to take into account such possible change, equations (5), (6) may be used for adjusting the extruder speed and sync.

Thus, for the wheel-type blow molding machine, it is seen that the distance between the die head and the mandrel is adjusted indirectly by adjusting the time synchronization between the initiation of the preprogrammed adjustments of such distance and the cutting of the continuous tube into shots. First updated values of the sync and extruder speed are calculated using the above equations 3–6 by means of controller 15 in FIG. 1. The sync and extruder speed are then adjusted to such updated values either manually or automatically by means of controller 15. The above described sync adjustment in the wheel-type machine and the adjustment in the die head to mandrel distance for the shuttle-type machine will both adjust the distribution of plastic material in the hollow object, or the material distribution function of the object.

While equations 3–6 represent one set of relationships which have been found to be useful and preferable for controlling bottle weight and bottle wall thickness, other polynomial functions of the extruder rotation speed and the pressure measured may also be useful and are within the scope of the invention. Furthermore, for a different wheel-type machine, equations 3–6 may retain their general form but with different constants. More generally, for wheel-type extrusion blow molding machines, in order to maintain the bottle weight at a target value within predetermined tolerance, the extruder speed may be adjusted by adding to a current value of the speed an error term that is a function of the difference between the predetermined bottle weight and the current value of the bottle weight and of the difference between pressure measured prior to the adjusting step and the pressure measured when extruding the parison resulting in the current value of the bottle weight. Preferably, the error term is a sum of a first quantity proportional to the difference between the predetermined bottle weight and the current value of the bottle weight and of a second quantity proportional to the difference between pressure measured prior to adjusting the extruder speed and the pressure measured when extruding the parison resulting in the current value of the bottle weight. To maintain a desired distribution of plastic material along the bottle wall, the synchronization sync may be adjusted as a function of the adjusted extruder rotational speed. Preferably, the sync is adjusted as a linear function of the adjusted extruder speed. Thus according to the above considerations, equations 3–6 may be re-written in their more general form as follows:

bottle weight=$M+N*r+O*p_2$ sync=$P+Q*r$ $r_{new}=r_{current}-R*(Target-bw_{current})+S*(P2_{current}-P2_{old})$
$Sync_{new}=T*r_{new}+U$ where R, S, T, U are constants; Target is the predetermined bottle weight; $bw_{current}$, $r_{current}$, $P2_{current}$ are respectively the bottle weight measured, extruder rotational speed and pressure measured prior to the adjustment step; $P2_{old}$ the pressure measured when extruding the parison resulting in a bottle with the weight $bw_{current}$; and $r_{new}$, $Sync_{new}$ are the extruder rotational speed and sync after the adjustment.

In the same vein, equations 1 and 2 may also be rewritten as follows for a more generalized form of the equations for shuttle-type extrusion blow molding machines in general:

parison velocity=$A+B*g+C*g^2+D*r+E*gr+F*r^2$ bottle weight=$G*+H*g+I*r+J*gr+K*r^2+L*v$;

where A, B, C, D, E, F, G, H, I, J, K, L are constants, and g, r, v are the weight gap, speed of the extruder and the viscosity of the plastic material respectively.

Control Algorithms

Figure 5:
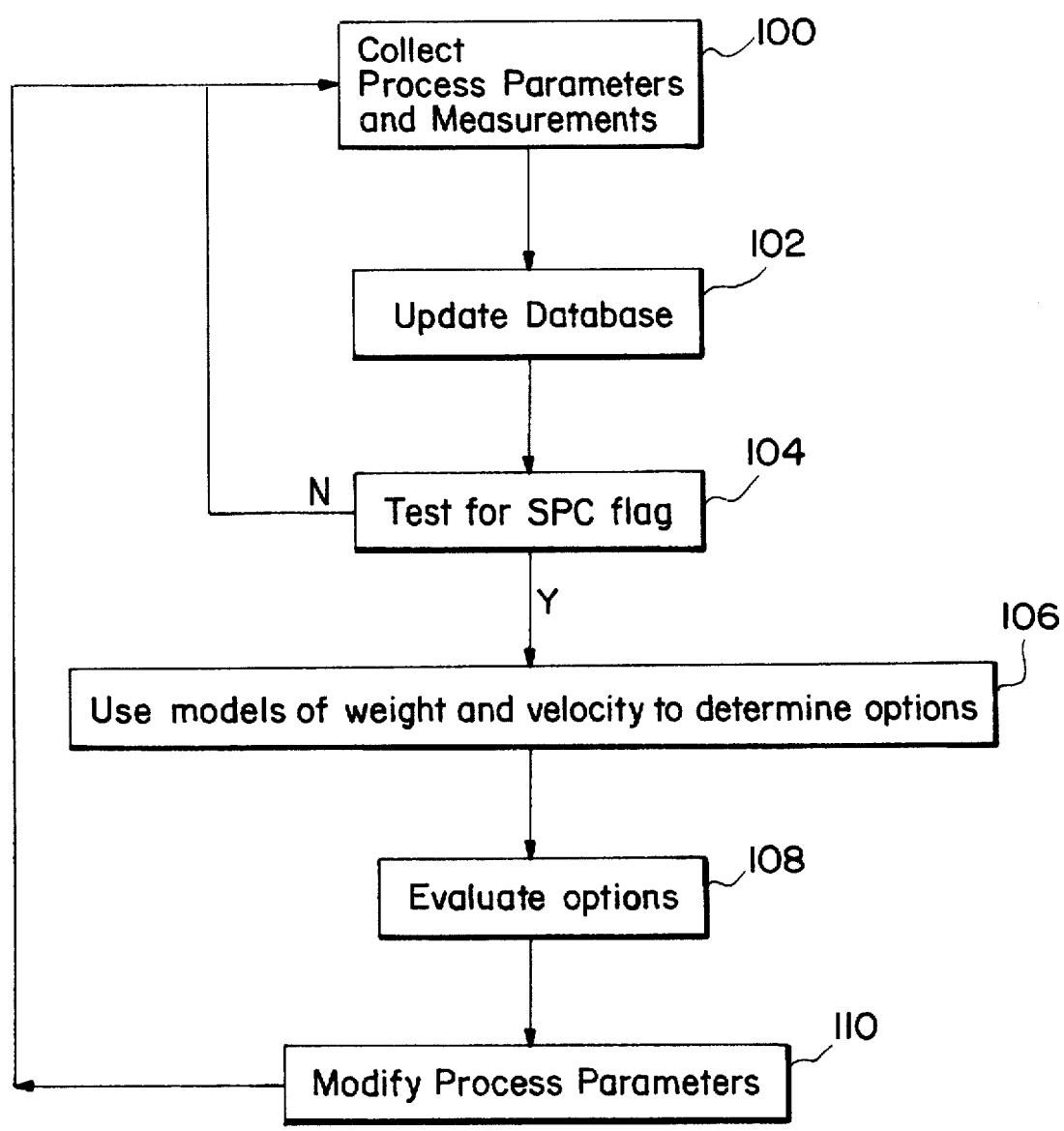
FIG. 5 is a flow chart illustrating a model based control algorithm for the control system of FIG. 1.

In the approaches discussed above with reference to shuttle-type and wheel-type extrusion blowmolding machines, a model is constructed from experimental data and the model is then used for adjusting the extruder RPM and/or the distance between the die head and the mandrel so as to maintain the bottle weight and parison velocity at target values within predetermined tolerances. In addition to multiple linear regression analysis that is used by applicants, other analytical techniques may be used for constructing models based on the data. A more generalized control algorithm is illustrated in the flow chart of FIG. 5. As shown in FIG. 5, process parameters and measurements are first collected to form a database. Thus, the experimental data described above for the shuttle-type and wheel-type machines are examples of such databases. As more parisons are extruded and blown into bottles, the database may be updated (block 102). In the preferred embodiments, controller 15 generates a warning SPC flag to indicate that the bottle weight and/or parison velocity monitored are no longer within predetermined tolerances of the target values. See Block 104. When this happens, a model is constructed using the database, such as in deriving equations using multiple linear regression analysis in the manner illustrated above, (Block 106). The model is used to predict the bottle weight and parison velocity when the distance between the die head and the mandrel or the extrusion rotational speed is increased or reduced by predetermined amounts. In other words, using the models of bottle weights and parison velocity, different options are determined as expressed by the following eight equations (Block 106):

$$w1 = \text{predicted weight1} = wf(\text{gap} + \Delta\text{gap, rpm, viscosity}) \quad (7)$$
$$w2 = \text{predicted weight2} = wf(\text{gap} - \Delta\text{gap, rpm, viscosity})$$
$$w3 = \text{predicted weight3} = wf(\text{gap, rpm} + \Delta\text{rpm, viscosity})$$
$$w4 = \text{predicted weight4} = wf(\text{gap, rpm} - \Delta\text{rpm, viscosity})$$
$$v1 = \text{predicted velocity1} = vf(\text{gap} + \Delta\text{gap, rpm, viscosity})$$
$$v2 = \text{predicted velocity2} = vf(\text{gap} - \Delta\text{gap, rpm, viscosity})$$
$$v3 = \text{predicted velocity3} = vf(\text{gap, rpm} + \Delta\text{rpm, viscosity})$$
$$v4 = \text{predicted velocity4} = vf(\text{gap, rpm} - \Delta\text{rpm, viscosity})$$

Then the eight adjustments in equations 7 above are evaluated to select one where the adjustment selected would minimize the differences between the predicted bottle weights and parison velocity and the target values for them in accordance with the model (Block 108). In other words, the different options posed by equations 7 in combination with the current bottle weight and parison velocity are compared so that the adjustment resulting in the minimum differences is selected. Thus, if w0 and v0 are the current bottle weight and parison velocity, the set (wi, vi) where i=0, . . . , 4, having the smallest error is determined, where:

$$\text{error}=\alpha/\text{wi}-\text{target weight}/+\beta/\text{vi}-\text{target velocity}/ \quad (8)$$

($\alpha$ and $\beta$ are normalization constants)

Then process parameters are modified in accordance with the determination of the value of i according to the equations 9 below (Block 110):

$$\begin{aligned}&\text{if } i^* = 1, \text{gap} \rightarrow \text{gap} + \Delta\text{gap} \quad (9)\\&\text{if } i^* = 2, \text{gap} \rightarrow \text{gap} - \Delta\text{gap}\\&\text{if } i^* = 3, \text{rpm} \rightarrow \text{rpm} + \Delta\text{rpm}\\&\text{if } i^* = 4, \text{rpm} \rightarrow \text{rpm} - \Delta\text{rpm}\\&\text{if } i^* = 0, \text{make no change}\end{aligned}$$

Alternatively, instead of carrying out the above-described steps in blocks 106–110 only upon detection of the warning (SPC) flag, SPC being the acronym for statistical process control, it is also possible to repeat such steps periodically and not in response to any warning flag. Such and other variations of the control method are within the scope of the invention.

Figure 6:
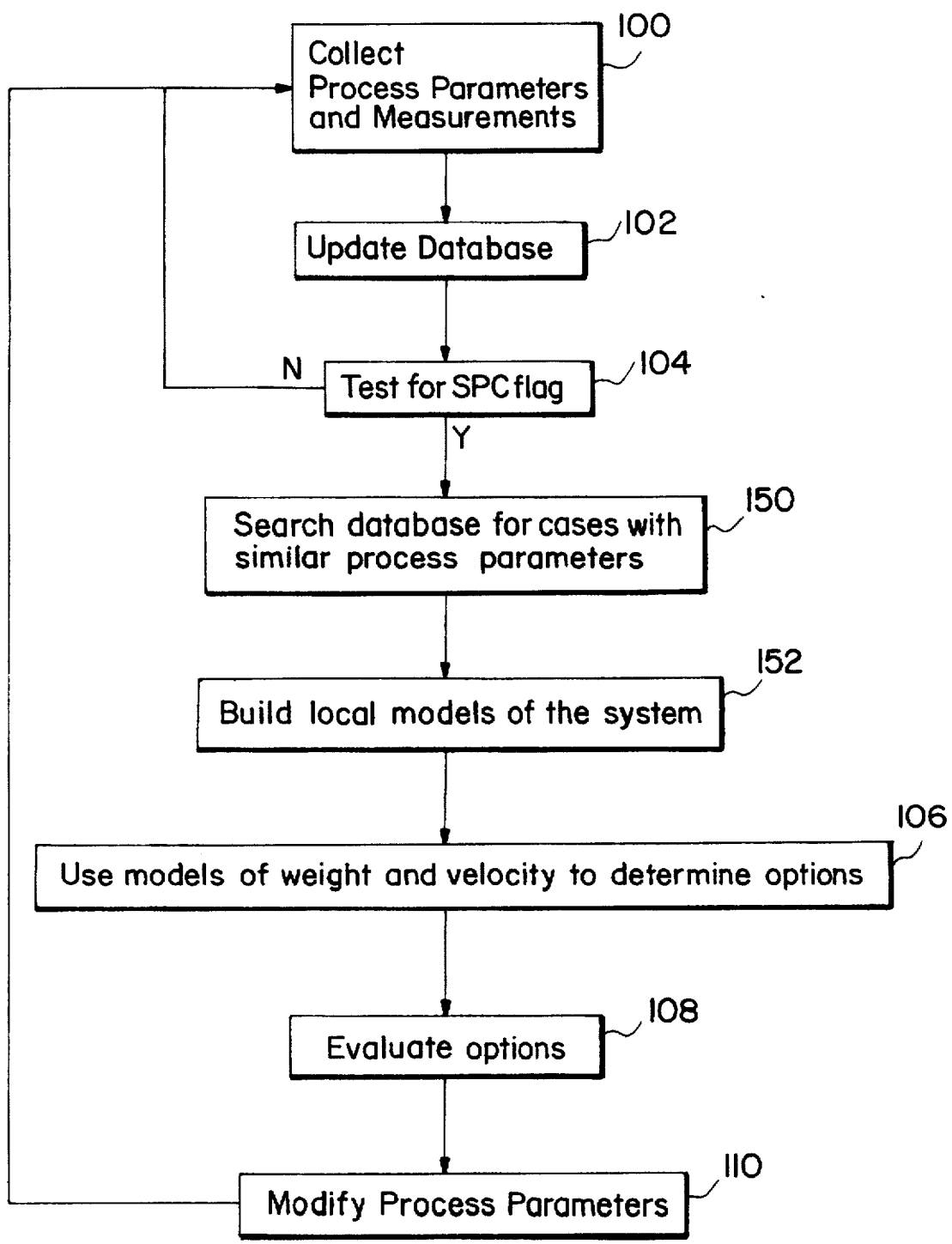
FIG. 6 is a flow chart of an experience based control algorithm for the control system of FIG. 1.

FIG. 6 is a flow chart illustrating an alternative control algorithm to that shown in FIG. 5. A comparison of FIGS. 5 and 6 will reveal that many of the steps are similar and are performed in a similar manner so that these steps are labeled by the same numerals. The differences between the two figures will now be explained. Because of the large number of parameters involved and of the possibility of time drift of these parameters, it may be that only a portion of the data points in a database contain the best information for making adjustments in order to maintain a constant bottle weight and parison velocity, so that data points other than these points are preferably excluded. For this reason, instead of using all of the data points in the database to construct the model, only some of the data points are so used. Thus, after performing the steps in blocks 100, 102 and 104, the database is searched for data points with similar process parameters (Block 150). This is performed by finding k number of cases that are similar to the current situation, where a case is similar to the current situation if:

$$\alpha/w\text{-current weight}/+\beta/\text{vi-current velocity}/+\gamma/\mu\text{i-current viscosity}/<\Sigma \quad (10)$$

where $\Sigma$ is a small number and $\alpha$, $\beta$ and $\gamma$ are normalization constants.

Then, a local model is constructed using only the k cases (Block 152). Once the model has been built, the model can then be used to develop options, evaluate the options, and modify the process parameters accordingly in the same manner as that described above in reference to FIG. 5 (Blocks 106, 108, 110). While the construction of models may be useful, in some cases examining the database itself may be adequate to predict an adjustment of the extruder speed or the die head to mandrel distance for minimizing the differences between the predicted bottle weight and parison velocity and the target values thereof so that the adjustments can be made accordingly. In such event, the method may simply comprise the following steps. The distance between the die head and the mandrel and the rotational speed of the extruder are first set to accomplish the target values of the bottle weight of the parison velocity. The raw plastic material is then fed to the machine and the extruder is operated for forming the parisons. The bottle weight and parison velocity that result when the distance between the die head and the mandrel or the extruder rotational speed is increased or reduced by predetermined amounts are then predicted to develop options for adjustment. One of the options for adjustment is then selected that minimizes the differences between the predicted bottle weight and parison velocity and the target values. Lastly, the distance between the die head and the mandrel or the speed of the extruder is then adjusted according to the selected adjustment.

The invention has been described above by reference to various embodiments. It will be understood that modifications and changes may be made without departing from the scope of the invention which is to be limited only by the appended claims.

Appendix A

Glossary

| | |
|---|---|
| Extruder | A machine used to melt resin at a controlled temperature while conveying it at a controlled rate. |
| Extruder Head | The portion of a blowmolding apparatus in which molten resin is shaped into a parison. |
| Extruder RPM | The rotational velocity of the extruder expressed in RPM. |
| Extruder Screw | A threaded shaft used to convey resin to the extruder head. |
| Mandrel | The portion of the extruder head that determines the inside diameter of the parison. |
| Melt Index | A characteristic of the resin determined by measuring the weight of melted resin extruded through an orifice in a given period of time under rigorously controlled conditions. |
| Parison | The hollow tube of molten resin which is extruded from the extruder head and which is inflated in the mold to form the bottle. |
| Shot Weight | The mass of the parison available for each mold. |
| Shuttle Machine | A type of blowmolder used with a continuous extruder where the molds are shuttled between positions under the extruder head and the blowing station. |
| Weight Gap | The gap between the mandrel and the extruder head through which the parison emerges. |
| Wheel Machine | A type of blowmolder used with a continuous extruder in which the molds are attached to a rotating wheel. |

Appendix B
1 of 2

| \multicolumn{7}{c}{Experimental Data} |
|---|---|---|---|---|---|---|
| Melt Index | Extruder RPM | Weigh GAP % | Shot Weight | Parison Viscosity | Pressure | Parison Velocity |
| 0.2 | 27 | 63 | 70.919 | 40131 | 1799 | 1.452 |
| 0.2 | 27 | 60 | 69.931 | 40022 | 1859 | 1.561 |
| 0.2 | 27 | 57 | 69.432 | 40222 | 1901 | 1.663 |
| 0.2 | 24.6 | 63 | 64.25 | 38133 | 1754 | 1.394 |
| 0.2 | 24.6 | 60 | 63.995 | 38170 | 1807 | 1.457 |
| 0.2 | 24.6 | 57 | 64.284 | 38572 | 1846 | 1.576 |
| 0.2 | 22.2 | 63 | 58.207 | 39814 | 1696 | 1.47 |
| 0.2 | 22.2 | 60 | 57.797 | 39608 | 1736 | 1.397 |
| 0.2 | 22.2 | 57 | 57.59 | 39695 | 1786 | 1.439 |
| 0.3 | 27 | 63 | 71.843 | 41585 | 1753 | 1.4932 |
| 0.3 | 27 | 60 | 71.075 | 42286 | 1795 | 1.5801 |
| 0.3 | 27 | 57 | 70.62 | 41489 | 1850 | 1.7176 |
| 0.3 | 24.6 | 63 | 64.368 | 39002 | 1698 | 1.4084 |
| 0.3 | 24.6 | 60 | 65.706 | 40584 | 1753 | 1.5056 |
| 0.3 | 24.6 | 57 | 65.191 | 40083 | 1787 | 1.6087 |
| 0.3 | 22.2 | 63 | 58.875 | 41724 | 1636 | 1.4066 |
| 0.3 | 22.2 | 60 | 59.806 | 40954 | 1681 | 1.4092 |
| 0.3 | 22.2 | 57 | 59.281 | 41379 | 1730 | 1.4596 |
| 0.4 | 27 | 63 | 71.267 | 39907 | 1692 | 1.462 |
| 0.4 | 27 | 60 | 70.303 | 40000 | 1735 | 1.539 |
| 0.4 | 27 | 57 | 70.377 | 39932 | 1793 | 1.655 |
| 0.4 | 24.6 | 63 | 65.364 | 38102 | 1641 | 1.413 |

APPENDIX B

| Experimental Data | | | | | | |
|---|---|---|---|---|---|---|
| Melt Index | Extruder RPM | Weigh GAP % | Shot Weight | Parison Viscosity | Pressure | Parison Velocity |
| 0.4 | 24.6 | 60 | 64.382 | 38409 | 1686 | 1.442 |
| 0.4 | 24.6 | 57 | 65.268 | 38233 | 1734 | 1.551 |
| 0.4 | 22.2 | 60 | 59.439 | 39493 | 1630 | 1.408 |
| 0.4 | 22.2 | 57 | 58.461 | 39476 | 1678 | 1.432 |

APPENDIX C

Algebraic Solution of the Intersection of Two Ellipses

The problem of finding the intersections of two ellipses may be solved as follows. Let the two ellipses be defined by the equations 1a and 1b:

$$a_1 x^2 + b_1 y^2 + c_1 xy + d_1 x + e_1 y = r_1 \qquad (1a)$$

$$a_2 x^2 + b_2 y^2 + c_2 xy + d_2 x + e_2 y = r_2 \qquad (1b)$$

The cross-term in equation 1a may be eliminated by rotating the coordinate axes through an appropriate angle $\theta$. This may be accomplished by substituting equations 2a and 2b below into equations 1a and 1b.

$$x = x' \cos\theta - y' \sin\theta \qquad (2a)$$

$$y = x' \sin\theta + y' \cos\theta \qquad (2b)$$

The angle $\theta$ is defined as the smallest positive angle satisfying $$\cot(2\theta) = \frac{a_1 - c_1}{c_1} \qquad (3)$$

This results in equations 4a and 4b.

$$a_1'(x')^2 + b_1'(y')^2 + d_1' x' + e_1' y' = r_1 \qquad (4a)$$

$$a_2'(x')^2 + b_2'(y')^2 + c_2' x' y' + d_2' x' + e_2' y' = r_2 \qquad (4b)$$

Equation 4a may be further simplified by removing the first-order terms. This may be done by substituting equations 5a and 5b below into equations 4a and 4b APPENDIX C
2 of 2

$$x' = x'' + h \qquad (5a)$$

$$y' = y'' + k \qquad (5b)$$

and setting $h = -\dfrac{d_1'}{2a'}$ and $k = -\dfrac{e_1'}{2b_1'}$. This reduces the two equations to $$a_1''(x'')^2 + b_1''(y'')^2 = r_1'' \qquad (6a)$$

$$a_2''(x'')^2 + b_2''(y'')^2 + c_2'' x'' y'' + d_2 x'' + e_2 y'' = r_2'' \qquad (6b)$$

Equation 6a may be rearranged to give $$y'' = \pm \sqrt{\dfrac{r_1'' - a_1''(x'')^2}{b_1''}}$$

This may be substituted into equation 6b which, after collecting the terms containing the radical sign on one side of the equation and squaring both sides, gives a quartic equation which may be solved according to methods found in standard math handbooks.[1]

---

[1] Richard Burrington, Handbook of Mathematical Tables and Formulas (Sandusky, Ohio: Handbook Publishers, Inc., 1956), pp 7-9.

APPENDIX D

Table 1. Comparison of Experimental and Calculated Values for Parison Velocity

| Measured Velocity | Predicted Velocity | Residual | Measured Velocity | Predicted Velocity | Residual |
|---|---|---|---|---|---|
| 1.45 | 1.46 | 0.00 | 1.51 | 1.51 | 0.01 |
| 1.56 | 1.54 | -0.02 | 1.61 | 1.59 | -0.02 |
| 1.66 | 1.68 | 0.02 | 1.41 | 1.42 | 0.01 |

[2] Although the experimental data do not comprise a standard experimental design for these three variables, the data points do cover the experimental space fairly well, and there is no strong correlation between viscosity and either of the other independent variables. Moreover, the estimated increase in the variance of predicted response values resulting from the use of this data set (as opposed to the original experimental design) is only about 15%.

APPENDIX D

| Measured Velocity | Predicted Velocity | Residual | Measured Velocity | Predicted Velocity | Residual |
|---|---|---|---|---|---|
| 1.39 | 1.41 | 0.02 | 1.41 | 1.41 | 0.00 |
| 1.46 | 1.45 | -0.01 | 1.46 | 1.45 | -0.01 |
| 1.58 | 1.55 | -0.02 | 1.46 | 1.45 | -0.01 |
| 1.47 | 1.43 | -0.04 | 1.54 | 1.54 | 0.00 |
| 1.4 | 1.41 | 0.01 | 1.66 | 1.67 | 0.02 |
| 1.44 | 1.45 | 0.01 | 1.41 | 1.41 | 0.00 |
| 1.49 | 1.49 | 0.00 | 1.44 | 1.46 | 0.01 |
| 1.58 | 1.58 | 0.00 | 1.55 | 1.54 | -0.01 |
| 1.72 | 1.71 | 0.00 | 1.41 | 1.41 | 0.00 |
| 1.41 | 1.44 | 0.03 | 1.43 | 1.45 | 0.02 |

Table 2. Comparison of Experimental and Calculated Values for Parison Shot Weight

| Measured Weight | Predicted Weight | Residual | Measured Weight | Predicted Weight | Residual |
|---|---|---|---|---|---|
| 70.92 | 70.94 | 0.02 | 65.71 | 65.52 | -0.19 |
| 69.93 | 70.38 | 0.45 | 65.19 | 65.12 | -0.07 |
| 69.43 | 69.96 | 0.53 | 58.88 | 59.15 | 0.27 |
| 64.25 | 64.65 | 0.40 | 59.81 | 58.96 | -0.85 |
| 64.00 | 64.48 | 0.48 | 59.28 | 59.28 | 0.00 |
| 64.28 | 64.47 | 0.19 | 71.27 | 70.84 | -0.43 |
| 58.21 | 58.33 | 0.12 | 70.3 | 70.37 | 0.07 |
| 57.80 | 58.38 | 0.58 | 70.38 | 69.84 | -0.54 |
| 57.59 | 58.56 | 0.97 | 65.36 | 64.63 | -0.73 |
| 71.84 | 71.56 | -0.28 | 64.38 | 64.58 | 0.20 |
| 71.07 | 71.36 | 0.29 | 65.27 | 64.32 | -0.95 |

APPENDIX D
3 of 3
| Measured Weight | Predicted Weight | Residual | Measured Weight | Predicted Weight | Residual |
|---|---|---|---|---|---|
| 70.62 | 70.51 | -0.11 | 59.44 | 58.33 | -1.11 |
| 64.37 | 65.02 | 0.65 | 58.46 | 58.46 | 0.00 |
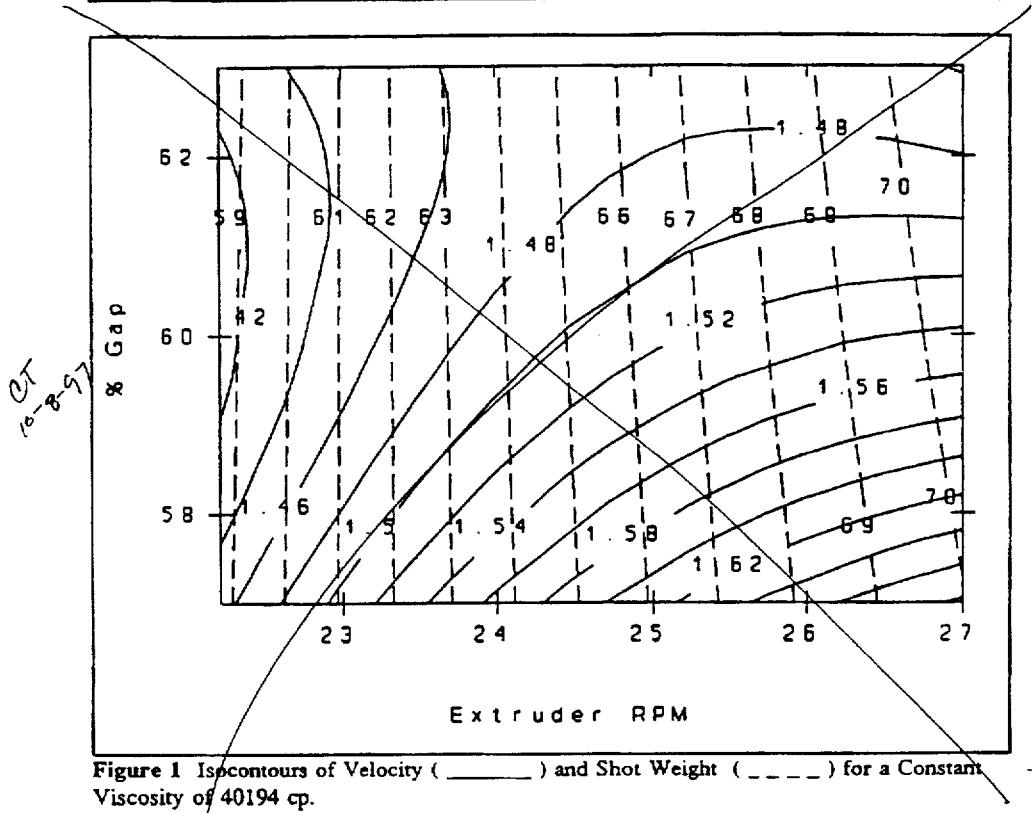
Figure 1 Isocontours of Velocity ( _____ ) and Shot Weight ( _ _ _ _ ) for a Constant Viscosity of 40194 cp.

What is claimed is:

1. A method for controlling a blow molding machine during a process of making a hollow object, said machine including a die head, a mandrel, an extruder that rotates and drives a plastic material between the mandrel and the die head to form a plurality of elongated parisons, and a controller that causes a material distribution function to change during the formation of the parisons in a preprogrammed manner so that parisons having desired relative thicknesses along their lengths are formed, said method comprising:

setting the distance between the die head and the mandrel and the rotational speed of the extruder to accomplish predetermined target values of weight of the object and parison velocity;

feeding said plastic material to said machine and operating said extruder for forming the parisons;

detecting pressure of the plastic material in the extruder at a location near the die head while the plastic material is being driven by the extruder; and adjusting the material distribution function and the speed of the extruder in the operation of the machine and extruder in response to the pressure so that object weight and velocity of the parisons made are maintained substantially at the target values, wherein said setting step sets and said adjusting step adjusts the function by setting and adjusting a reference distance between the die head and mandrel during the formation of the parisons, said reference distance defining a weight gap g of the machine.

2. The method of claim 1, said method further comprising molding each of said parisons into an object, and measuring weights of the objects, wherein each of said setting and adjusting steps includes choosing the weight gap and extruder speeds according to a relationship between the parison velocity, object weight, speed of the extruder, weight gap and the viscosity of the plastic material where the parison velocity and object weight are polynomial functions of the speed of the extruder, weight gap and the viscosity of the plastic material, in order to maintain object weight and velocity of the parison made within predetermined tolerances.

3. The method of claim 2, wherein the parison velocity is a quadratic function of the speed of the extruder and weight gap.

4. The method of claim 2, wherein the object weight is a quadratic function of the speed of the extruder and a linear function of the weight gap and the viscosity of the plastic material.

5. The method of claim 2, wherein the relationship between the parison velocity, object weight, speed of the extruder, weight gap and the viscosity of the plastic material is according to the following equations:

parison velocity=$A+B*g+C*g^2+D*r+E*gr+F*r^2+Gv+Hrv+v_2$ object weight=$J*+K*g+L*r+M*gr+N*r^2+O*v$;

where A, B, C, D, E, F, G, H, I, J, K, L, M, N, 0 are constants, and g, r, v are the weight gap, speed of the extruder and the viscosity of the plastic material respectively.

6. The method of claim 1, wherein said feeding step feeds said plastic material continually to said machine.

7. The method of claim 1, wherein said adjusting step adjusts the distance between to die head and the mandrel and the speed of the extruder in the operation of the machine in response to changes in characteristics of the plastic material fed to the machine or charges in operating conditions of the machine.

8. The method of claim 1, wherein said machine is fed and the extruder operated in the feeding and operating step to form a continuous tube of plastic material, said method further including:

causing the distance between the die head and the mandrel to change during the formation of the tube comprising a plurality of parisons in a preprogrammed manner so that each of the parisons formed has desired relative thicknesses along its length; and cutting said tube to form shots, wherein said setting step sets and said adjusting step adjusts the distance between the die head and the mandrel by setting or adjusting time synchronization between the cutting step and the causing step, wherein time synchronization sync is a time delay between the cutting step and initiation of the change in distance between the die headland the mandrel of the causing step, said adjusting step adjusting the material distribution function by adjusting sync.

9. The method of claim 1, said method further comprising molding said parisons into objects, and measuring weights of the objects, and wherein said adjusting step adjusts the sync and the extruder rotation speed to obtain a desired object weight according to relationships where the object weight and sync are polynomial functions of the extruder rotation speed and the pressure measured.

10. The method of claim 9, wherein the object weight and sync are linear functions of the extruder rotation speed and the pressure measured.

11. The method of claim 10, wherein the object weight and sync are functions of the extruder rotation speed and the pressure measured according to the following relationships:

object weight=$M+N*r+O*p_2$ sync=$P+Q*r$;

where M, N, O, P, Q are constants, r the extruder rotation speed, and $p_2$ the pressure measured.

12. The method of claim 9, wherein sync is the time delay between the cutting step and initiation of the change in distance between the die head and the mandrel of the causing step, said method further comprising molding said parisons into objects, and measuring weights of the objects, wherein said adjusting step adjusts the extruder speed to obtain an adjusted extruder speed by adding to or subtracting from a current value of the extruder speed an error term that is a function of the difference between the predetermined object weight and a current value of the object weight and of the difference between pressure measured prior to the adjusting step and the pressure measured when extruding the parison resulting in said current value of the object weight.

13. The method of claim 12, wherein said error term is a sum of a first quantity proportional to the difference between the target object weight and a current value of the object weight and a second quantity proportional to the difference between pressure measured prior to the adjusting step and the pressure measured when extruding the parison resulting in said current value of the object weight.

14. The method of claim 12, wherein said adjusting step adjusts the sync as a function of extruder rotational speed.

15. The method of claim 14, wherein said adjusting step adjusts the sync as a linear function of the adjusted extruder rotational speed.

16. The method of claim 12, wherein said adjusting step adjusts the extruder speed and synchronization sync according to the following relations:

$r_{new} = r_{current} + R*(\text{Target} - bw_{current}) + S*(P2_{current} - P2_{old})$ $\text{Sync}_{new} = T*r_{new} + U$ where R, S, T, U are constants; Target is the predetermined object weight; $bw_{current}$, $r_{current}$, $P2_{current}$ are respectively the object weight, extruder rotational speed and pressure measured prior to the adjustment step; $P2_{old}$ the pressure measured when extruding the parison resulting in an object with the weight $bw_{current}$; and $r_{new}$, $Sync_{new}$ are the extruder rotational speed and sync after adjustment.

17. The method of claim 1, said method further comprising:

predicting object weight and parison velocity when the distance between the die head and the mandrel or the extruder rotational speed is increased or reduced by predetermined amounts; and selecting an adjustment defined by the increase or reduction of the distance or extruder rotational speed that minimized the differences between the predicted object weight and parison velocity and the target object weight and parison velocity;

wherein the adjusting step increases or reduces the distance and the extruder rotational speed according the said selected adjustment.

18. The method of claim 17, said machine having a controller that sets a warning flag to alert an operator when the distance between the die head and the mandrel is changed, said method further comprising detecting said warning flag and triggering the predicting step when the warning flag is detected.

19. The method of claim 17, wherein said predicting step predicts object weight and parison velocity when the distance or the extruder rotational speed is increased or reduced by predetermined amounts according to a model.

20. The method of claim 17, further comprising repeatedly measuring object weight and parison velocity at known extruder rotational speeds and distances between the die head and the mandrel, and collecting in a database such measurements, wherein said predicting step predicts object weight and parison velocity when the distances or the extruder rotational speed are increased or reduced by predetermined amounts in reference to the database.

21. The method of claim 20, wherein said predicting step includes:

identifying from the database a group of sets of values, each set including previously measured object weight and parison velocity and their corresponding extruder rotational speed and distances between the die head and the mandrel, wherein the values in each set differ from current values by less than predetermined amounts; and comparing current values of the object weight, parison velocity, extruder rotational speed and distances between the die head and the mandrel to corresponding values in the sets in the group;

wherein said identifying step includes identifying one set from the group to minimize the difference between the predetermined and the predicted object weight and parison velocity based on a comparison of the selected set of values to the current values of the object weight, parison velocity, extruder rotational speed and distances between the die head and the mandrel.

22. The method of claim 1, said method further comprising using a controller to automatically derive updated values of the distance between the die head and the mandrel and the speed of the extruder in the operation of the machine, wherein said adjusting step adjusts the distance between the die head and the mandrel and the speed of the extruder in the operation of the machine to the updated values.

23. A method for controlling a blow molding machine during a process of making an object, said machine including a die head, a mandrel, an extruder that rotates and drives a plastic material between the mandrel and the die head to form a plurality of elongated parisons and a controller that causes a material distribution function to change during the formation of the parisons in a preprogrammed manner so that parisons having desired relative thicknesses along their lengths are formed, said method comprising:

setting the distance between the die head and the mandrel and the rotational speed of the extruder to accomplish predetermined target values of object weight and parison velocity;

feeding said plastic material to said machine and operating said extruder for forming the parisons;

predicting object weight and parison velocity when the distance between the die head and the mandrel or the extruder rotational speed is increased or reduced by predetermined amounts;

detecting pressure in the plastic material in the extruder at a location near the die head while the plastic material is being driven by the extruder;

selecting in response to said pressure an adjustment defined by the increase or reduction of the distance or extruder rotational speed that minimizes the differences between the predicted object weight and parison velocity and the predetermined object weight and parison velocity; and adjusting the distance between the die head and the mandrel or the speed of the extruder in the operation of the machine according to said selected adjustment so that object weight and velocity of the parisons made are maintained at the target values within predetermined tolerances, wherein said setting step sets and said adjusting step adjusts the function by setting and adjusting a reference distance between the die head and mandrel during the formation of the parisons.

24. The method of claim 23, said machine comprising a controller that sets a warning flag to alert an operator when the distance between the die head and the mandrel is changed, said method further comprising detecting said warning flag and triggering the predicting step when the warning flag is detected.

25. The method of claim 23, wherein said predicting step predicts object weight and parison velocity when the distance or the extruder rotational speed is increased or reduced by predetermined amounts according to a model.

26. The method of claim 23, further comprising repeatedly measuring object weight and parison velocity at known extruder rotational speeds and distances between the die head and the mandrel, and collecting in a database such measurements, wherein said predicting step predicts object weight and parison velocity when the distances or the extruder rotational speed are increased or reduced by predetermined amounts in reference to the database.

27. The method of claim 26, wherein said predicting step includes:

identifying from the database a group of sets of values, each set including previously measured object weight and parison velocity and their corresponding extruder rotational speed and distances between the die head and the mandrel, wherein the values in each set differ from current values by less than predetermined amounts;

comparing current values of the object weight, parison velocity, extruder rotational speed and distances between the die head and the mandrel to corresponding values in the sets in the group; and selecting one set from the group to minimize the difference between the predetermined and the predicted object weight and parison velocity based on a comparison of the selected set of values to the current values of the object weight, parison velocity, extruder rotational speed and distances between the die head and the mandrel.

* * * * *